United States Patent
Kinoshita et al.

(10) Patent No.: US 12,223,071 B2
(45) Date of Patent: Feb. 11, 2025

(54) PROTECTING DEVICE AND PROTECTING METHOD

(71) Applicant: NIPPON TELEGRAPH AND TELEPHONE CORPORATION, Tokyo (JP)

(72) Inventors: Kazumi Kinoshita, Tokyo (JP); Takeshi Nagayoshi, Tokyo (JP); Kimihiro Yamakoshi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 658 days.

(21) Appl. No.: 17/059,139

(22) PCT Filed: May 28, 2019

(86) PCT No.: PCT/JP2019/021080
§ 371 (c)(1),
(2) Date: Nov. 25, 2020

(87) PCT Pub. No.: WO2019/230715
PCT Pub. Date: Dec. 5, 2019

(65) Prior Publication Data
US 2021/0216659 A1 Jul. 15, 2021

(30) Foreign Application Priority Data
May 30, 2018 (JP) .................................. 2018-104038

(51) Int. Cl.
*G06F 21/62* (2013.01)
*G06F 16/17* (2019.01)

(52) U.S. Cl.
CPC ...... *G06F 21/6218* (2013.01); *G06F 16/1727* (2019.01)

(58) Field of Classification Search
CPC .................. G06F 21/6218; G06F 16/1727
(Continued)

(56) References Cited

U.S. PATENT DOCUMENTS 7,249,379 B2 * 7/2007 Larsen ................ G06F 21/6218
726/16
8,515,434 B1 * 8/2013 Narendran ............ H04W 48/02
455/452.2

(Continued)

FOREIGN PATENT DOCUMENTS

CN 101477486 A * 7/2009
CN 102984134 A * 3/2013

(Continued)

OTHER PUBLICATIONS

Chen, Sitong, and Hu Chen. "A General Enterprise Business Protection System Based on USB Key and Virtualization." In 2011 International Conference on Intelligence Science and Information Engineering, pp. 329-332. IEEE, 2011. (Year: 2011).*

(Continued)

*Primary Examiner* — Luu T Pham
*Assistant Examiner* — Walter J Malinowski (57) ABSTRACT

A protection device includes a memory, and processing circuitry coupled to the memory and configured to acquire a list of file paths of predetermined protection target files, and perform an operation of protecting data of a file corresponding to a file path included in the list.

7 Claims, 9 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 8,950,007 | B1* | 2/2015 | Teal | H04L 63/20 726/30 |
| 9,819,663 | B1* | 11/2017 | Gauda | G06F 16/11 |
| 10,372,937 | B2 | 8/2019 | Huang et al. | |
| 2006/0106841 | A1* | 5/2006 | Bybee | G06F 16/13 |
| 2006/0272023 | A1* | 11/2006 | Schmeidler | H04L 63/065 726/26 |
| 2008/0243846 | A1* | 10/2008 | Rasmussen | G06F 16/1774 |
| 2010/0257372 | A1* | 10/2010 | Seifert | G06F 21/6218 713/189 |
| 2010/0318501 | A1* | 12/2010 | Alaimo | G06F 21/64 707/694 |
| 2010/0318507 | A1* | 12/2010 | Grant | G06Q 30/0269 707/706 |
| 2012/0030439 | A1* | 2/2012 | Engelsiepen | G06F 16/128 711/E12.002 |
| 2013/0144846 | A1* | 6/2013 | Chhaunker | H04L 67/02 707/E17.002 |
| 2013/0268493 | A1* | 10/2013 | Berman | G06F 11/1469 707/649 |
| 2014/0317733 | A1* | 10/2014 | Chen | G06F 21/31 726/22 |
| 2015/0135329 | A1* | 5/2015 | Aghasaryan | H04L 63/0421 726/26 |
| 2015/0142840 | A1* | 5/2015 | Baldwin | G06F 16/24 707/758 |
| 2016/0275134 | A1* | 9/2016 | Tandel | G06F 16/23 |
| 2016/0300074 | A1 | 10/2016 | Huang et al. | |
| 2016/0371500 | A1* | 12/2016 | Huang | G06F 21/6218 |
| 2016/0371504 | A1* | 12/2016 | Huang | G06V 40/16 |
| 2017/0249472 | A1* | 8/2017 | Levy | G06F 21/6245 |
| 2018/0039651 | A1* | 2/2018 | Tobin | G06F 16/2428 |
| 2018/0102902 | A1* | 4/2018 | Yang | H04L 9/3226 |
| 2018/0189301 | A1* | 7/2018 | Kannan | G06F 16/113 |
| 2018/0336336 | A1* | 11/2018 | Elovici | G06F 21/32 |
| 2019/0095285 | A1* | 3/2019 | McCormack | G06F 11/1451 |
| 2019/0158501 | A1* | 5/2019 | Peppe | H04L 63/107 |
| 2019/0158512 | A1* | 5/2019 | Zhang | H04L 63/145 |

FOREIGN PATENT DOCUMENTS

| | | | | |
|---|---|---|---|---|
| CN | 102984135 | A * | 3/2013 | |
| CN | 104268468 | A | 1/2015 | |
| CN | 105450756 | A * | 3/2016 | H04L 43/0805 |
| CN | 105519038 | A | 4/2016 | |
| CN | 105631312 | A * | 6/2016 | |
| JP | 2004-220400 | A | 8/2004 | |
| JP | 2009-026022 | A | 2/2009 | |
| JP | 2012-212197 | A | 11/2012 | |
| JP | 2018026133 | A * | 2/2018 | |
| WO | WO-2019212111 | A1 * | 11/2019 | G06F 21/55 |

OTHER PUBLICATIONS

Seo, InSeog, InJung Kim, JangHong Yoon, and JaeCheol Ryou. "Detection of unknown malicious codes based on group file characteristics." In 2010 Proceedings of the 5th International Conference on Ubiquitous Information Technologies and Applications, pp. 1-6. IEEE, 2010. (Year: 2010).*

Zhan, Dongyang, Lin Ye, Binxing Fang, Xiaojiang Du, and Shen Su. "Cfwatcher: A novel target-based real-time approach to monitor critical files using vmi." In 2016 IEEE International Conference on Communications (ICC), pp. 1-6. IEEE, 2016. (Year: 2016).*

Takata, Masanori, and Atsushi Sutoh. "Event-notification-based inactive file search for large-scale file systems." In 2012 Digest APMRC, pp. 1-7. IEEE, 2012. (Year: 2012).*

Japanese Application No. 2018-104038, Notification of Reason for Refusal mailed Feb. 4, 2020, 6 pages.

Japanese Application No. 2018-104038, Decision to Grant a Patent mailed Apr. 28, 2020, 5 pages.

* cited by examiner

| FILE PATH |
|---|
| /a/b/f1 |
| /c/f2 |
| /a/d/f3 |
| ...... |

Fig. 3

| FILE PATH | EXECUTION FILE PATH OF PROCESS CAPABLE OF MAKING ACCESS |
|---|---|
| /a/b/f1 | /x/y |
| /c/f2 | /x/w |
| /c/f2 | /x/z |
| ...... | ...... |

PROTECTING DEVICE AND PROTECTING METHOD

CROSS-REFERENCE TO RELATED APPLICATIONS

This application is a U.S. 371 Application of International Patent Application No. PCT/JP2019/021080, filed on 28 May 2019, which application claims priority to and the benefit of JP Application No. 2018-104038, filed on 30 May 2018, the disclosures of which are hereby incorporated herein by reference in their entireties.

TECHNICAL FIELD

The present invention relates to a protection device and a protection method.

BACKGROUND ART

Conventionally, methods for protecting files on a file system against deletion due to an unauthorized process or the carelessness of the user are known. For example, for Linux (registered trademark), authority is set for a user to write to a directory or a file, thus making it possible to prohibit deletion or the like of the file by the user. Furthermore, for Linux, i (immutable) attribute is set for a file as an extended attribute, thus making it possible to prevent deletion or the like of the file.

Also, a method is known in which a protection target file is moved to a protected area that is inaccessible from an operating system (OS), thereby preventing deletion or the like of the file (see, e.g., Patent Literature 1).

CITATION LIST

Patent Literature

[Patent Literature 1] Japanese Laid-open Patent Publication No. 2004-220400

SUMMARY OF THE INVENTION

Technical Problem

However, the conventional methods are problematic in that there may be cases where it is difficult to efficiently protect files. For example, as for the method in which authority is set, files cannot be sufficiently protected when the authority is seized illicitly or the authority is erroneously set. As for the method in which a file is moved to a protected area, a file needs to be moved each time it is used, which takes time and effort. Moreover, there is a problem in that restriction is imposed on a program that uses the file.

Means for Solving the Problem

In order to solve the above-described problems and attain an object, a protection device includes: a memory; and processing circuitry coupled to the memory and configured to: acquire a list of file paths of predetermined protection target files, and perform an operation of protecting data of a file corresponding to a file path included in the list.

Effects of the Invention

According to the present invention, it is possible to protect files efficiently.

DESCRIPTION OF EMBODIMENTS

Hereinafter, embodiments of a protection device and a protection method according to the present application will be described in detail with reference to the drawings. Note that the present invention is not limited by the embodiments described below.

Configuration of First Embodiment

Figure 1:
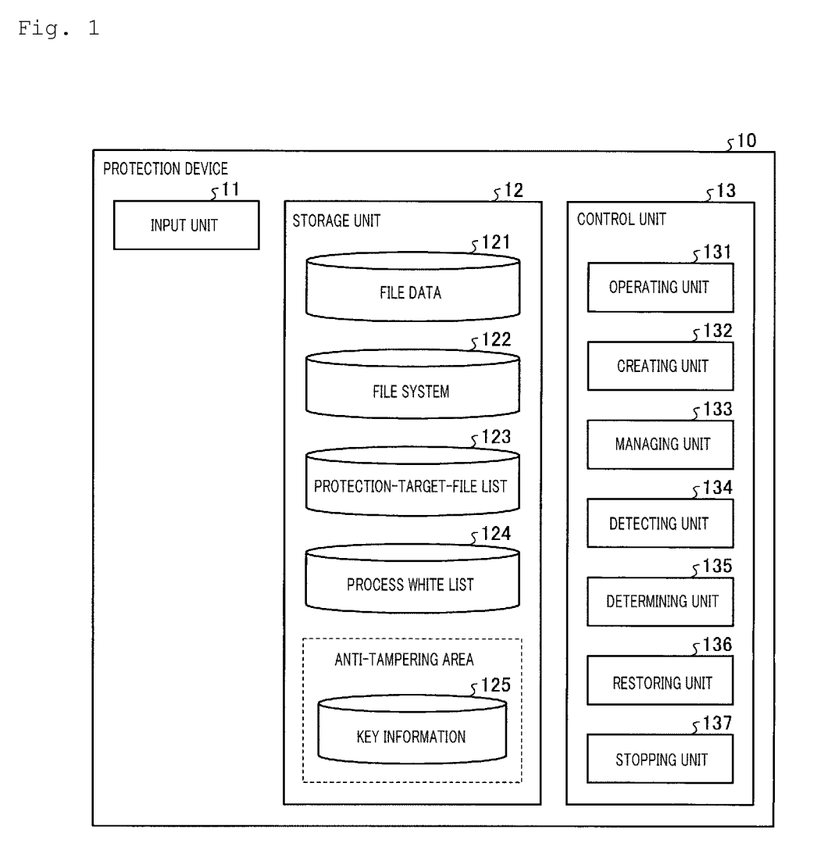
FIG. 1 is a diagram showing an example of the configuration of a protection device according to a first embodiment.

First, the configuration of a protection device according to a first embodiment will be described with reference to FIG. 1. FIG. 1 is a diagram showing an example of the configuration of the protection device according to the first embodiment. As shown in FIG. 1, a protection device 10 includes an input unit 11, a storage unit 12, and a control unit 13.

The input unit 11 receives input of data from a user. The input unit 11 is, for example, an input device such as a mouse and a keyboard. Alternatively, the input unit 11 may be an interface for receiving input of data from another device.

The storage unit 12 is a storage device such as a hard disk drive (HDD), a solid state drive (SSD), and an optical disk. Note that the storage unit 12 may be a data-rewritable semiconductor memory such as a random access memory (RAM), a flash memory, and a non-volatile static random access memory (NVSRAM). The storage unit 12 stores an OS and various programs that are executed in the protection device 10. Additionally, the storage unit 12 stores various types of information used for executing the programs. The storage unit 12 also stores file data 121, a file system 122, a protection-target-file list 123, a process white list 124, and key information 125.

The storage unit 12 stores a file entity as the file data 121. Also, the storage unit 12 stores the file system 122. The file system 122 is information for accessing a file entity contained in the file data 121. The file system 122 includes a file path of each file of the file data 121. Note that the file system 122 may be implemented as a basic function of the OS.

In the present embodiment, creating a link means making a file accessible via the file system 122. Deleting a link means making a created link unusable. For example, the protection device 10 creates a link by adding a file path of a file to the file system 122, and deletes the link by deleting the file path.

Figure 2:
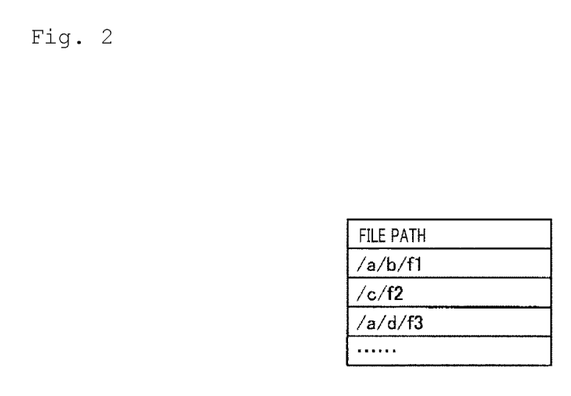
FIG. 2 is a diagram showing an example of a protection-target-file list according to the first embodiment.

The protection-target-file list 123 is information for identifying a file that is to be protected by the protection device 10. The protection-target-file list 123 is an example of a list of file paths of predetermined protection target files. In the present embodiment, the protection-target-file list 123 is a list of file paths of protection target files. FIG. 2 is a diagram showing an example of the protection-target-file list according to the first embodiment. As shown in FIG. 2, for example, the protection-target-file list 123 includes the file path "/a/b/f1" of a protection target file.

The process white list 124 is information indicating a process capable of making access for each file. In the present embodiment, the process white list 124 is a list of combinations of file paths of files and paths of processes that are allowed to access the respective files.

Figure 3:
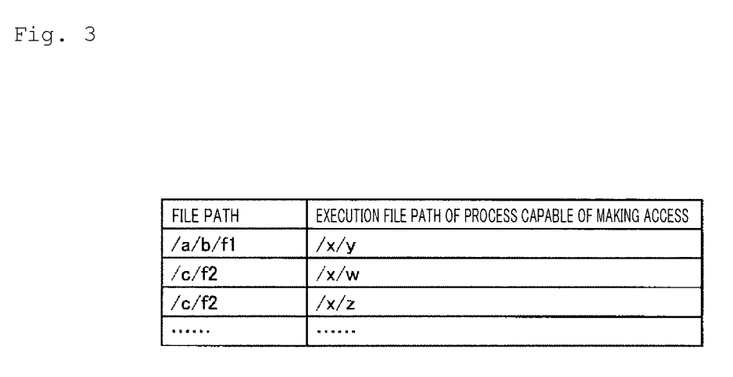
FIG. 3 is a diagram showing an example of a process white list according to the first embodiment.

FIG. 3 is a diagram showing an example of the process white list according to the first embodiment. As shown in FIG. 3, processes capable of making access are identified by execution file paths. Also, as shown in FIG. 3, processes that use "/x/w" and "/x/z" as execution files correspond to the file path "/c/f2". Thus, a plurality of processes may correspond to one file in the process white list 124.

The key information 125 is information for managing the protection-target-file list 123 and the process white list 124 in a secure state. For example, the key information 125 is used for encryption of each list or addition of a signature to each list. In order to further increase the robustness, the key information 125 may be stored in an anti-tampering area.

The control unit 13 controls the overall protection device 10. The control unit 13 is, for example, an electronic circuit such as a central processing unit (CPU) and a micro processing unit (MPU), or an integrated circuit such as an application specific integrated circuit (ASIC) and a field programmable gate array (FPGA). The control unit 13 includes an internal memory for storing a program specifying various processing procedures, and control data, and executes various types of processing using the internal memory. The control unit 13 functions as various processing units through operation of various programs. For example, the control unit 13 includes an operating unit 131, a creating unit 132, a managing unit 133, a detecting unit 134, a determining unit 135, a restoring unit 136, and a stopping unit 137.

Note that the operating unit 131 and the creating unit 132 may be implemented as basic functions of the OS, as in the case of the file system 122. On the other hand, the detecting unit 134, the determining unit 135, the restoring unit 136, and the stopping unit 137 can request the OS for execution of processing, and execute processing in response to a request from the OS. Accordingly, the present embodiment is realized by implementing the managing unit 133, the detecting unit 134, the determining unit 135, the restoring unit 136, and the stopping unit 137 into a computer having an OS such as Linux installed thereon.

The operating unit 131 performs an operation of protecting data of a file corresponding to a file path included in the protection-target-file list 123. The operating unit 131 can perform the protecting operation at a timing at which the protection device 10 is started. The operating unit 131 can protect the data of a file by opening the file. Also, the operating unit 131 can close the file.

Opening a file means making the file available for various types of processing such as reading, alteration, and deletion. On the other hand, when a file is opened, the actual data of the file is in a protected state. That is, even if a file that is being opened by a certain process is subjected to deletion performed by another process, only the link of the file is deleted, and the actual data thereof will not be deleted. Closing a file means making the file unavailable for various type of processing.

The creating unit 132 creates a link of a file. The operating unit 131 and the creating unit 132 can execute processing in response to a request from another processing unit.

The managing unit 133 manages the protection-target-file list 123 and the process white list 124. The managing unit 133 can perform addition, deletion, and the like of data to and from the protection-target-file list 123 and the process white list 124.

At the time of starting the system of the protection device 10, the managing unit 133 uses the key information 125 to confirm that the protection-target-file list 123 and the process white list 124 have not been altered, and thereafter expands the protection-target-file list 123 and the process white list 124 onto a volatile area (hereinafter referred to as a "memory") of the storage unit 12. At the time of ending the system of the protection device 10, the protection-target-file list 123 and the process white list 124 that have been expanded are stored in a nonvolatile area of the storage unit 12 by a secure method using the key information 125. Note that the secure method refers to encryption using a key, addition of a signature, and the like.

The detecting unit 134 detects that a link to a file has been deleted. For example, the detecting unit 134 can detect the deletion using inotify, which is an application programming interface (API) of Linux. If deletion of a link has been detected, the detecting unit 134 acquires the file path of the file corresponding to the deleted link.

Note that even if the link of a protection target file being opened by the operating unit 131 has been deleted at the time of starting the protection device 10, the actual data of the file will not be deleted. Accordingly, as long as the link of the protection target file that has been deleted can be restored, the protection device 10 can return the file into the state before deletion.

The detecting unit 134 further detects that access is being made to a file. For example, the detecting unit 134 can detect access using fanotify, which is an API of Linux. If access to a file has been detected, the detecting unit 134 acquires a combination of the file path of the accessed file and the file path of the execution file of the process of the access source.

Here "access" means opening of a file or requesting opening of a file. The detecting unit 134 can detect access by receiving information related to requesting of opening of a file.

Based on the file path of a file, the determining unit 135 determines whether or not the file is a protection target file. Specifically, if deletion of a link has been detected by the detecting unit 134, the determining unit 135 receives the file path of the file corresponding to the deleted link from the detecting unit 134, and determines whether or not the file path exists in the protection-target-file list 123.

Based on the file path of the file and the process that is making the access, the determining unit 135 further determines whether or not to allow the access. Specifically, if access to a file has been detected by the detecting unit 134, the determining unit 135 receives, from the detecting unit 134, a combination of the file path of the accessed file and the file path of the execution file of the process of the access source, and determines whether or not to allow the access depending on which of the following three cases the combination corresponds to.

The first case is a case where the combination itself exists in the process white list 124. The second case is a case where only the file path of the accessed file exists in the process white list 124, and the file path of the execution file does not exist. The third case is a case where the file path of the accessed file does not exist in the process white list 124. Note that a case where only the file path of the execution file exists in the process white list 124 is included in the third case.

For example, in the example shown in FIG. 3, a combination in which the file path of the accessed file is "/a/b/f1" and the file path of the execution file is "/x/y" corresponds to the first case. For example, in the example shown in FIG. 3, a combination in which the file path of the accessed file is "/a/b/f1" and the file path of the execution file is "/x/z" corresponds to the second case. For example, in the example shown in FIG. 3, a combination in which the file path of the accessed file is "/a/b/f0" corresponds to the third case, regardless of the file path of the execution file. Note that it is assumed here that the fourth line onward in FIG. 3 does not exist in the process white list 124.

If the received combination corresponds to one of the first case and the third case, the determining unit 135 determines to allow the access. On the other hand, if the received combination corresponds to the second case, the determining unit 135 determines not to allow the access.

If it is determined by the determining unit 135 that the file is a protection target file, the restoring unit 136 restores the link to the file. Specifically, if it is determined by the determining unit 135 that the file path of the file corresponding to the deleted link exists in the protection-target-file list 123, the restoring unit 136 requests the creating unit 132 to create the link.

If the determining unit 135 that the access is not allowed, the stopping unit 137 stops the access. Specifically, the stopping unit 137 can stop the access by requesting the operating unit 131 not to open the file.

Processing of First Embodiment

Figure 4:
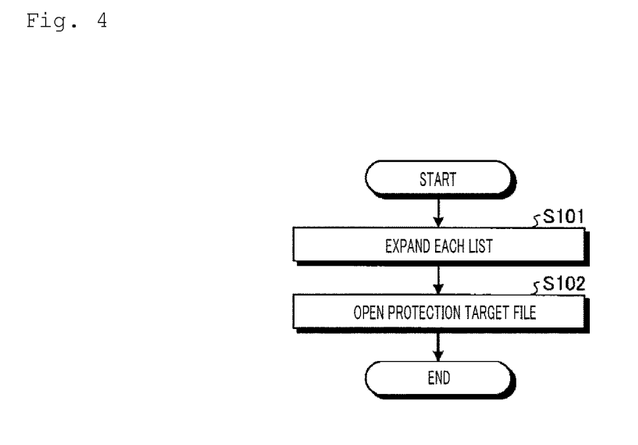
FIG. 4 is a flowchart illustrating a flow of processing in the protection device according to the first embodiment at the time of starting a system.

Processing in the protection device 10 at the time of starting the system will be described with reference to FIG. 4. FIG. 4 is a flowchart illustrating a flow of processing in the protection device according to the first embodiment at the time of starting the system.

As shown in FIG. 4, when the system is started, the managing unit 133 uses the key information 125 to confirm that the protection-target-file list 123 and the process white list 124 have not been altered, and expands each list onto a memory (step S101).

The managing unit 133 transfers a file path included in the protection-target-file list 123 to the operating unit 131, and requests the operating unit 131 to open the corresponding file. Then, the operating unit 131 opens the file corresponding to the received file path (step S102).

Figure 5:
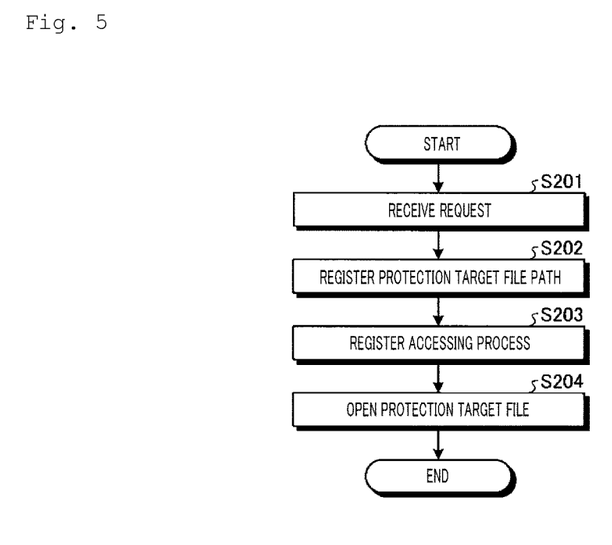
FIG. 5 is a flowchart illustrating a flow of processing in the protection device according to the first embodiment at the time of adding a protection target file.

Processing in the protection device 10 at the time of adding a protection target file will be described with reference to FIG. 5. FIG. 5 is a flowchart illustrating a flow of processing in the protection device according to the first embodiment at the time of adding a protection target file.

As shown in FIG. 5, the managing unit 133 receives a request to add a protection target file (step S201). For example, the request may be input by the user via the input unit 11, or may be automatically generated when a new file is added to the file system 122. The request contains the file path of a file to be added as a protection target, or a combination of the file path of the file and the file path of the process capable of accessing the file.

The managing unit 133 adds the file path contained in the request to the protection-target-file list 123 (step S202). Also, the managing unit 133 adds a combination of the file path of the file and the file path of the process that are contained in the request to the process white list 124 (step S203). Note that if the file path of the process is not contained in the request, the managing unit 133 does not perform addition to the process white list 124.

The managing unit 133 transfers the file path of the file that has been added to each list to the operating unit 131, and requests the operating unit 131 to open the corresponding file. Then, the operating unit 131 opens the file corresponding to the received file path (step S204).

Figure 6:
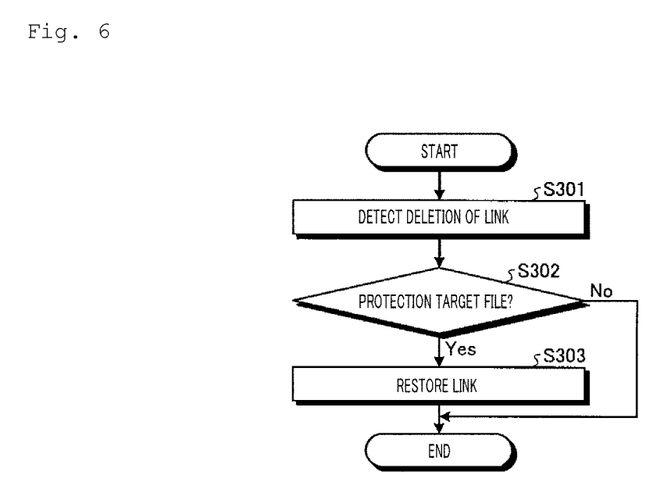
FIG. 6 is a flowchart illustrating a flow of processing in the protection device according to the first embodiment at the time of deleting a file.

Processing in the protection device 10 at the time of deleting a file will be described with reference to FIG. 6. FIG. 6 is a flowchart illustrating a flow of processing in the protection device according to the first embodiment at the time of deleting a file.

As shown in FIG. 6, the detecting unit 134 detects deletion of a link (step S301). Then, based on the file path received from the detecting unit 134, the determining unit 135 determines whether or not the file corresponding to the link for which deletion has been detected is a protection target file (step S302).

Here, if the file is a protection target file (step S302, Yes), the restoring unit 136 restores the link (step S303). On the other hand, if the file is not a protection target file (step S302, No), the protection device 10 does not restore the link.

Figure 7:
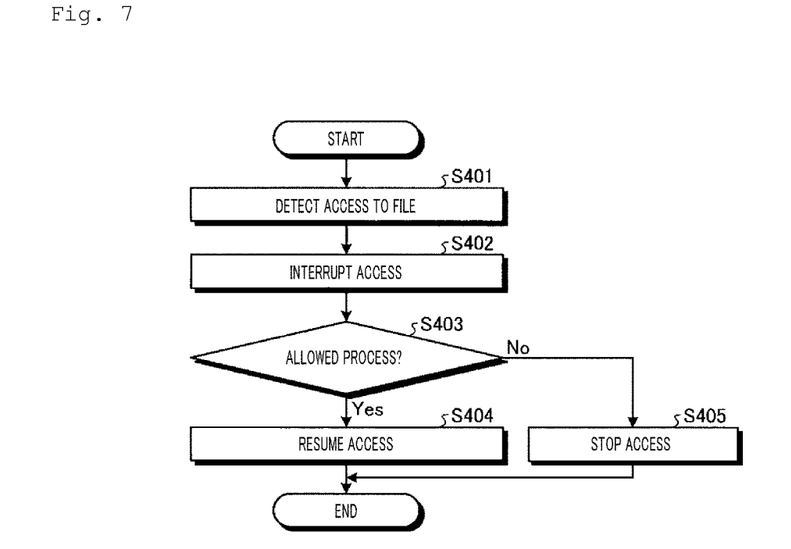
FIG. 7 is a flowchart illustrating a flow of processing in the protection device according to the first embodiment at the time of controlling access.

Access controlling processing in the protection device 10 will be described with reference to FIG. 7. FIG. 7 is a flowchart illustrating a flow of processing in the protection device according to the first embodiment at the time of controlling access.

As shown in FIG. 7, the detecting unit 134 detects access to a file (step S401). Here, the detecting unit 134 requests the operating unit 131 to interrupt the access, or in other words, opening of the file. Then, the operating unit 131 interrupts the access in response to the request from the detecting unit 134 (step S402).

Then, based on whether or not the file path of the accessed file and the file path of the process of the access source that have been received from the detecting unit 134 exist in the process white list 124, the determining unit 135 determines whether or not the access to the file by the process has been allowed (step S403).

Here, if the access has been allowed (step S403, Yes), the determining unit 135 requests the operating unit 131 to resume the access that has been interrupted. Then, the operating unit 131 resumes the access in response to the request from the determining unit 135 (step S404). Note that if the file path of the accessed file does not exist in the process white list 124 in the first place, or in other words, if the received combination corresponds to the third case described above, the determining unit 135 determines that the access has been allowed.

On the other hand, if the access has not been allowed (step S403, No), the stopping unit 137 requests the operating unit 131 to stop the access that has been interrupted. Then, the operating unit 131 stops the access in response to the request from the stopping unit 137 (step S405).

Figure 8:
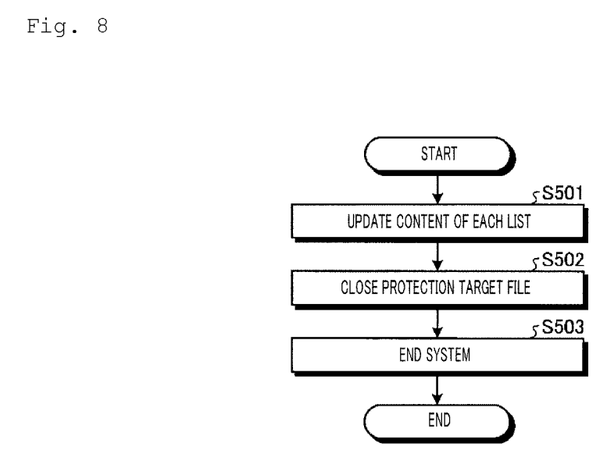
FIG. 8 is a flowchart illustrating a flow of processing in the protection device according to the first embodiment at the time of ending the system.

Processing in the protection device 10 at the time of ending the system will be described with reference to FIG. 8. FIG. 8 is a flowchart illustrating a flow of processing in the protection device according to the first embodiment at the time of ending the system.

As shown in FIG. 8, the managing unit 133 updates the protection-target-file list 123 and the process white list 124 (step S501). For example, the managing unit 133 overwrites the original data with the protection-target-file list 123 and the process white list 124 that are expanded on the memory. At this time, the protection-target-file list 123 and the process white list 124 on the memory may have been altered, for example, due to addition of a protection target file, since the time when they were expanded onto the memory.

The managing unit 133 transfers the file path included in the protection-target-file list 123 to the operating unit 131, and requests the operating unit 131 to close the corresponding file. Then, the operating unit 131 closes the file corresponding to the received file path (step S502). Then, the protection device 10 ends the system (step S503).

Effects of First Embodiment

In the first embodiment, the protection device 10 acquires a list of file paths of predetermined protection target files. The protection device 10 performs an operation of protecting data of a file corresponding to a file path included in the list. Thus, in the present embodiment, it is possible to protect files without setting authority or moving the storage area. Therefore, according to the present embodiment, it is possible to protect files efficiently.

The protection device 10 protects data of a file by opening the file. Thus, in the present embodiment, it is possible to protect files using a basic function included in the OS.

The protection device 10 can acquire the list at a timing at which the protection device 10 is started. At this time, the operating unit 131 performs an operation of protecting the data at a timing at which the list is acquired by the managing unit 133. Thus, by opening a protection target file during starting, it is possible to protect the file more reliably.

The protection device 10 detects that a link to a file has been deleted. Based on the file path to a file, the protection device 10 determines whether or not the file is a protection target file. If it is determined that the file is a protection target file, the protection device 10 restores the link to the file. Thus, according to the present embodiment, at the time of protecting a file against deletion, it is not necessary to set authority regarding deletion, or changing the location or content of the file.

In the protection device 10, the detecting unit 134 can detect that access is being made to a file. At this time, in the protection device 10, based on the file path of the file and the process that is making access, the determining unit 135 determines whether or not to allow the access. If it is determined that the access is not allowed, the protection device 10 stops the access. Thus, according to the present embodiment, access to a file can be controlled for each process, and it is therefore possible to protect a file against not only deletion, but also alteration.

Other Embodiments

Although an example of a case where the OS of the protection device 10 is Linux has been described in the above embodiment, the OS of the protection device 10 is not limited to Linux. For example, when the OS of the protection device 10 is other than Linux, it is also possible to realize the above-described embodiment by detecting deletion of a file and access to a file using a monitoring function similar to inotify and fanotify.

[System Configuration, etc.]

The constituent elements of the devices illustrated in the drawings are functionally conceptual, and are not necessarily configured physically as illustrated in the drawings. That is, specific modes of distribution and integration of the devices are not limited to those illustrated in the drawings, and all or part of the devices can be configured while being functionally or physically distributed or integrated in any unit according to various types of loads, use status, and the like. Further, all or any part of the processing functions executed in the devices can be realized by a CPU and a program analyzed and executed in the CPU, or can be realized as hardware by a wired logic.

Of the various types of processing described in the embodiments of the present invention, all or part of each processing described as being performed automatically may be performed manually, or all or part of each processing described as being performed manually may be automatically performed by a known method. In addition, the processing procedures, control procedures, specific names, information containing various types of data and parameters described in the above document and illustrated in the drawings may be changed freely unless otherwise specified.

[Program]

In an embodiment, the protection device 10 can be implemented by installing, on a desired computer, a protection program executing the above-described protection as package software or online software. For example, by causing an information processing device to execute the above-described protection program, the information processing device can function as the protection device 10. The information processing device as mentioned herein includes a desktop or notebook personal computer. In addition, a mobile communication terminal such as a smartphone, a mobile phone, and a personal handyphone system (PHS), and also a slate terminal such as a personal digital assistant (PDA) fall under the category of the information processing device.

Figure 9:
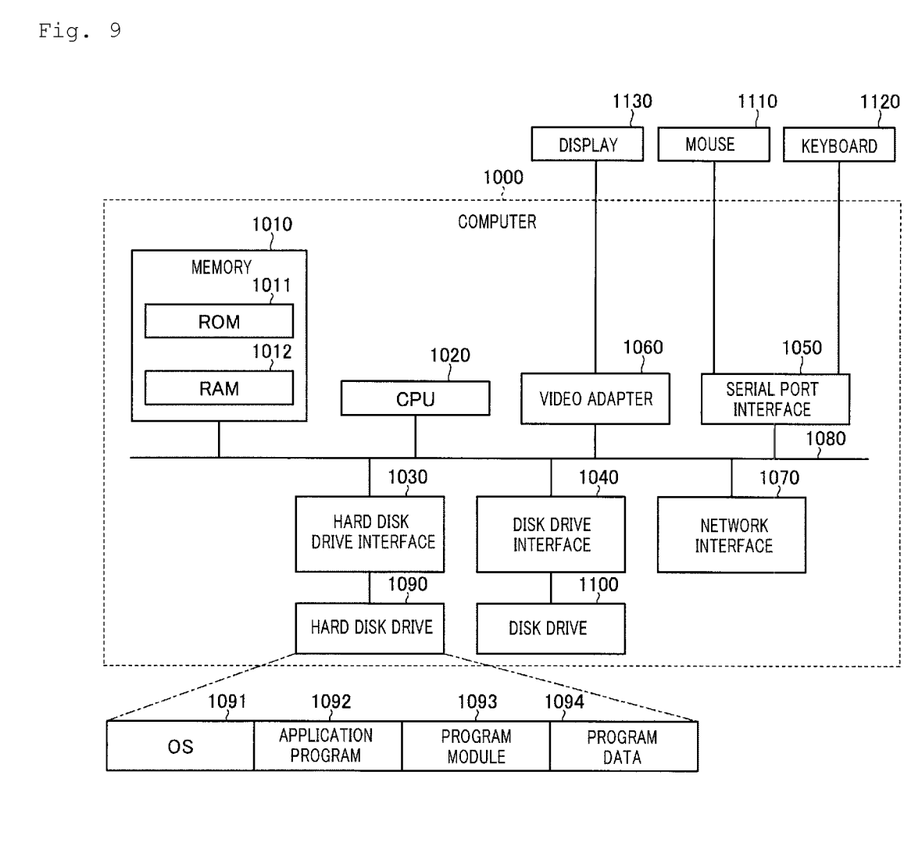
FIG. 9 is a diagram showing an example of a computer that executes a protection program.

FIG. 9 is a diagram showing an example of a computer that executes the protection program. A computer 1000 includes a memory 1010 and a CPU 1020, for example. Also, the computer 1000 includes a hard disk drive interface 1030, a disk drive interface 1040, a serial port interface 1050, a video adapter 1060, and a network interface 1070. Each of these units is connected by a bus 1080.

The memory 1010 includes a read only memory (ROM) 1011 and a RAM 1012. The ROM 1011 stores a boot program such as a basic input output system (BIOS), for example. The hard disk drive interface 1030 is connected to a hard disk drive 1090. The disk drive interface 1040 is connected to a disk drive 1100. For example, a removable storage medium such as a magnetic disk and an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. That is, the program specifying various types of processing of the protection device 10 is implemented as a program module 1093 in which a computer-executable code is written. The program module 1093 is stored in the hard disk drive 1090, for example. For example, a program module 1093 for executing the same processing as the functional configuration in the protection device 10 is stored in the hard disk drive 1090. Note that the hard disk drive 1090 may be replaced with an SSD.

The setting data used in the processing of the embodiment described above is stored, as the program data 1094, in the memory 1010 or the hard disk drive 1090, for example. Then, the CPU 1020 reads the program module 1093 and the program data 1094 stored in the memory 1010 or the hard disk drive 1090 to the RAM 1012 as needed, and executes the processing of the embodiment described above.

Note that the program module 1093 and the program data 1094 are not necessarily stored in the hard disk drive 1090, and may be stored in a removable storage medium, for example, and read by the CPU 1020 via the disk drive 1100 or the like. Alternatively, the program module 1093 and the program data 1094 may be stored in another computer connected via a network (e.g., a local area network (LAN) and a wide area network (WAN)). Then, the program module 1093 and the program data 1094 may be read from the other computer by the CPU 1020 via the network interface 1070.

REFERENCE SIGNS LIST

10 Protection device
11 Input unit
12 Storage unit
13 Control unit
121 File data
122 File system
123 Protection-target-file list
124 Process white list
125 Key information
131 Operating unit
132 Creating unit
133 Managing unit
134 Detecting unit
135 Determining unit
136 Restoring unit
137 Stopping unit

The invention claimed is:

1. A protection device comprising:
a memory; and
processing circuitry coupled to the memory and configured to:
  acquire a list of file paths of predetermined protection target files, wherein the predetermined protection target files are immutable and are prevented from deletion; and
  perform an operation of protecting data of a file corresponding to a file path included in the list, wherein the processing circuitry is further configured to:
    detect deletion of a link to the file,
    query the list for the file path to the file,
    determine the file as among the predetermined protection target files according to the list based on the file path of the file,
    restore, in response to the determination of the file as among the predetermined protection target file based on the file path of the file, the link to the file, and
    detect access by a process to the file, wherein the access includes a request to opening the file,
    in response to the detecting access to the file, acquire a combination of the file path of the accessed file and the file path of an execution file of the process of an access source, and
    deny the request to opening the file when the file path of the accessed file path exists in the list while the file path of the execution file does not exist in the list.

2. The protection device according to claim 1, wherein the processing circuitry is further configured to protect the data of the file by opening the file.

3. The protection device according to claim 1, wherein the processing circuitry is further configured to:
  acquire the list at a timing at which the protection device is started, and
  perform the operation of protecting the data at a timing at which the list is acquired.

4. The protection device according to claim 1, wherein the processing circuitry is further configured to:
  detect that access is being made to the file,
  determine whether to allow the access, based on the file path of the file and a process that is making the access, and
  stop the access if determining not to allow the access.

5. The protection device according to claim 1 further comprising
  wherein access to the file is granted if the file path of the accessed file does not exist in
  the process whitelist.

6. A protection method comprising:
acquiring a list of file paths of predetermined protection target files, wherein the predetermined protection target files are immutable and are prevented from deletion; and
performing an operation of protecting data of a file corresponding to a file path included in the list, by processing circuitry;
  detecting deletion of a link to the file;
  querying the list for the file path to the file,
  determining the file as among the predetermined protection target files according to the list based on the file path of the file;
  restoring, in response to the determination of the file as among the predetermined protection target files based on the file path of the file, the link to the file; and
  detecting access by a process to the file, wherein the access includes a request to opening the file when the file path of the accessed file path exists in the list while the file path of the execution file does not exist in the list;
  in response to the detection access to the file, acquiring a combination of the file path of the accessed file and the file path of an execution file of the process of an access source; and
  denying the request to opening the file.

7. The protection method according to claim 6 further comprising wherein access to the file is granted if a combination of the file path of the accessed file and the file path of an execution file of the process of an access source is in a process whitelist.

* * * * *